United States Patent

Maldavs

[11] Patent Number: 4,598,896
[45] Date of Patent: Jul. 8, 1986

[54] QUICK DISCONNECT COUPLING
[75] Inventor: Ojars Maldavs, Lincoln, Nebr.
[73] Assignee: Imperial Clevite Inc., Glenview, Ill.
[21] Appl. No.: 766,147
[22] Filed: Aug. 16, 1985
[51] Int. Cl.[4] .............................................. F16L 37/28
[52] U.S. Cl. .............................. 251/149.6; 137/454.2; 137/614.04; 285/924
[58] Field of Search ....................... 137/454.2, 614.04; 251/149.6; 285/DIG. 25, 924

[56] References Cited
U.S. PATENT DOCUMENTS
3,791,411 2/1974 Bogeskov et al. ........... 251/149.6 X
3,809,122 5/1974 Berg ................................ 137/614.06
4,077,433 3/1978 Maldavs .
4,303,098 12/1981 Shindelar .

Primary Examiner—Gerald A. Michalsky
Attorney, Agent, or Firm—Russell E. Baumann

[57] ABSTRACT

A female coupling includes an outer housing and a cartridge removably mounted in the housing. The cartridge includes a retainer sleeve which is stationary within the housing, a valve body and a spool attached to the valve body which are slidable axially within the housing, and a valve which is slidable axially within the valve body. A seal on the retainer sleeve seals a port in the spool when the female coupling is connected to a male coupling, and the spool is axially movable relative to the seal to relieve the internal pressure in the female coupling during connection and disconnection of the male coupling. A piston is slidably mounted within the valve body to assist in closing the valve during disconnection.

11 Claims, 8 Drawing Figures

{ 4,598,896 }

QUICK DISCONNECT COUPLING

BACKGROUND AND SUMMARY

This invention relates to quick disconnect couplings, and, more particularly, to a female quick disconnect coupling which requires a very low pull force to disconnect and a very low push force to connect.

Quick disconnect couplings are used, for example, to connect hydraulic fluid line hoses. A typical application is on agricultural tractors to connect the tractor hydraulic system with the attachable implements.

Over the years changes have occurred in tractor hydraulic systems which have required changes and performance improvements in the couplings. The invention provides a coupling which is improved over prior designs such as those shown in U.S. Pat. Nos. 4,077,433 and 4,303,098.

The major advantages of the inventive coupling over previous designs include:

1. A very low pull force is required to disconnect the coupling when it is pressurized with high internal hydraulic pressure.
2. Very low oil spillage occurs when disconnecting while a coupling is pressurized.
3. A very low push force is required to connect the coupling when either half or both halves are pressurized.
4. The female coupling can overcome trapped pressure in the male coupling half when the trapped pressure exceeds the pressure capability of the tractor output pressure.
5. A simple and unique method is provided for installing, retaining, and removing the cartridge assembly in the outer housing of the female coupling.
6. A unique seal retainer retains an elastomer seal under high pressure during opening and closing operations.
7. The female coupling can drain pressure relief fluid along with normal disconnect spillage to a remote location.

DESCRIPTION OF THE DRAWING

The invention will be explained in conjunction with an illustrative embodiment shown in the accompanying drawing, in which.

DESCRIPTION OF THE SPECIFIC EMBODIMENT

Figure 3:
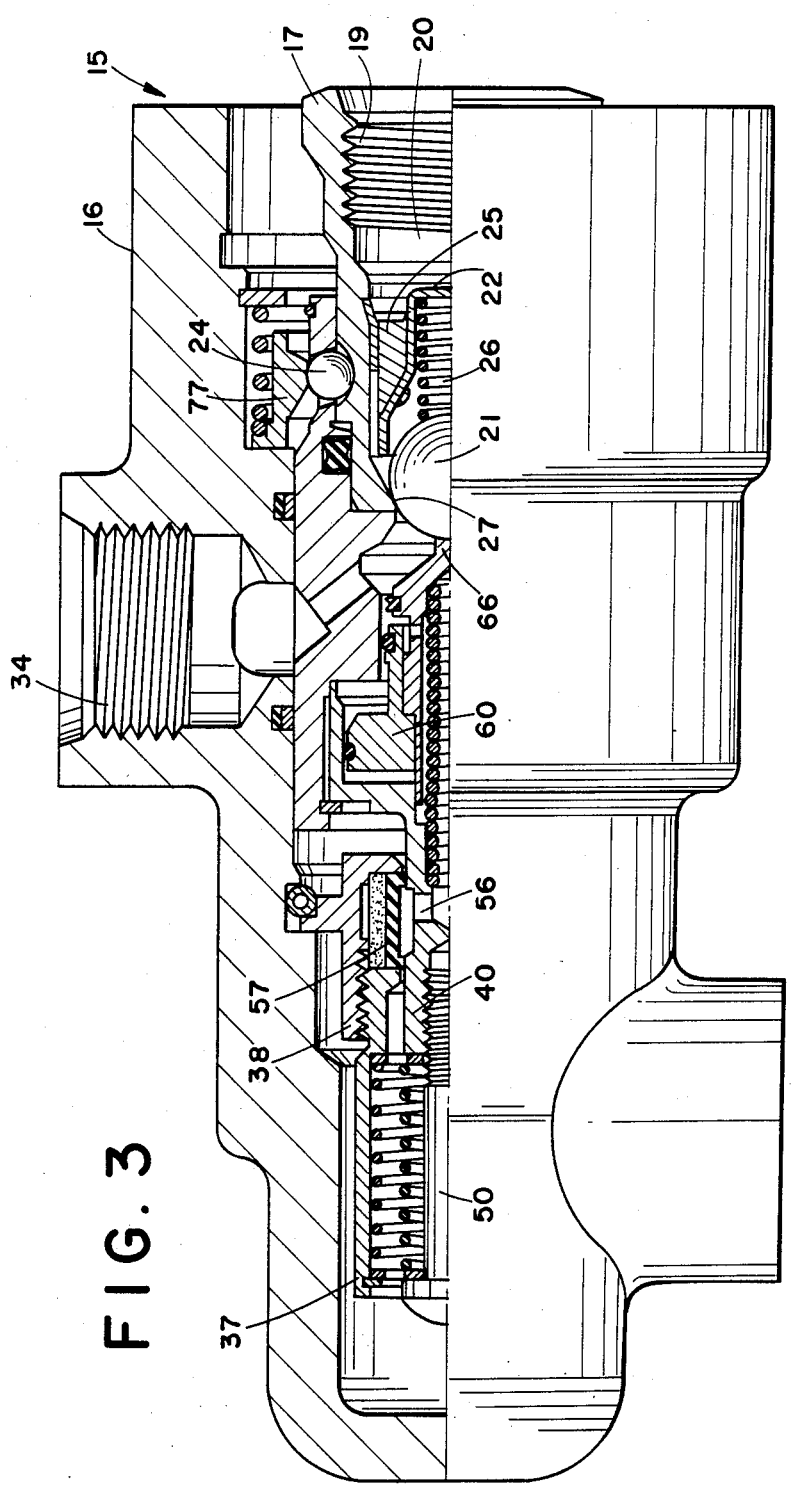
FIG. 3 is a view similar to FIG. 1 showing the male coupling fully connected and latched and the male valve closed.

Referring first to FIG. 3, the numeral 15 designates generally a quick connect and disconnect coupling which includes a female coupling half 16 and a male coupling half 17. The male coupling 17 may be conventional, and the particular male coupling illustrated is of the type which is described in U.S. Pat. No. 4,221,235. The female coupling 16 may be mounted on a tractor and the male coupling 17 may be mounted on an agricultural implement.

The male coupling 17 includes an outer tubular housing 19 having an internal bore 20 and a valve closure or ball 21 which is retained within a shroud 22. A groove 23 (FIG. 6) is provided in the housing for receiving the locking balls 24 of the female coupling. The shroud 22 is mounted within the male housing 19 by a spider support 25, and a spring 26 biases the ball 21 to the left against a seat 27 at the forward end of the male housing 19.

Figure 1:
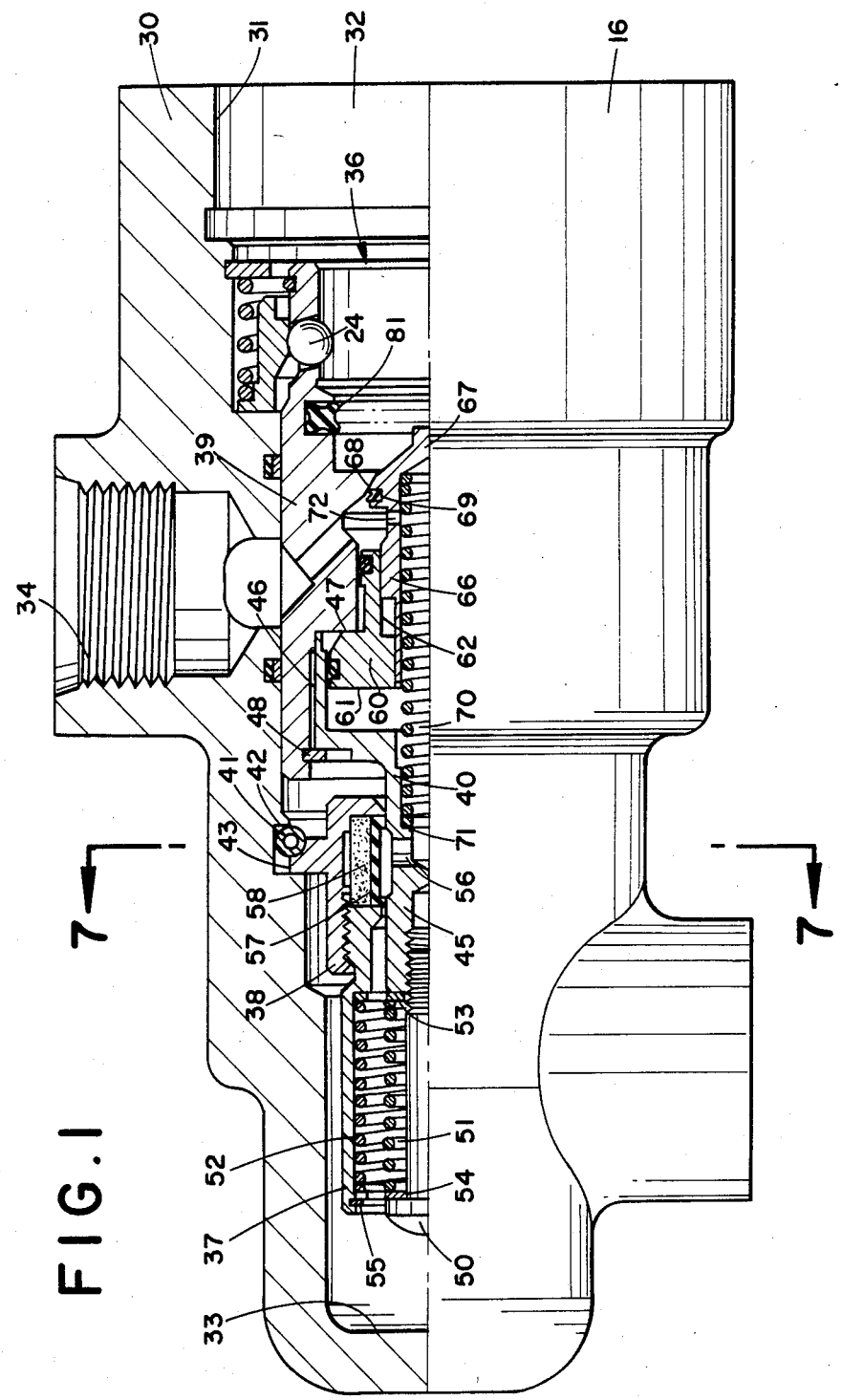
FIG. 1 is a side elevational view, partially in section, of a female coupling formed in accordance with the invention.

Referring now to FIG. 1, the female coupling 16 includes an outer tubular housing 30 with an internal bore 31 which has an open end 32 and a closed end 33. The tractor hydraulic supply is connected to the female coupling by a port 34.

Figure 7:
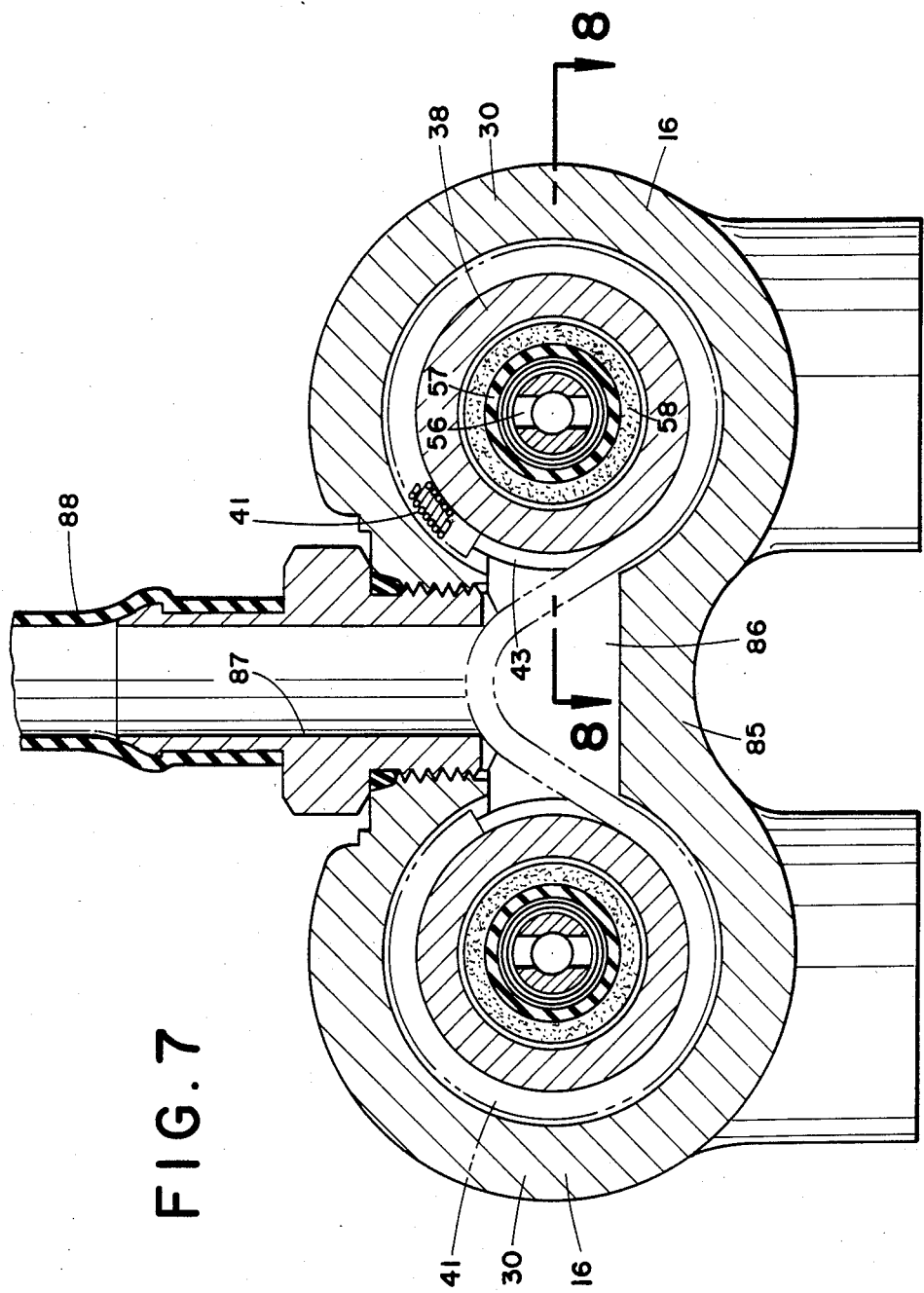
FIG. 7 is a sectional view taken along the line 7—7 of FIG. 1.
Figure 8:
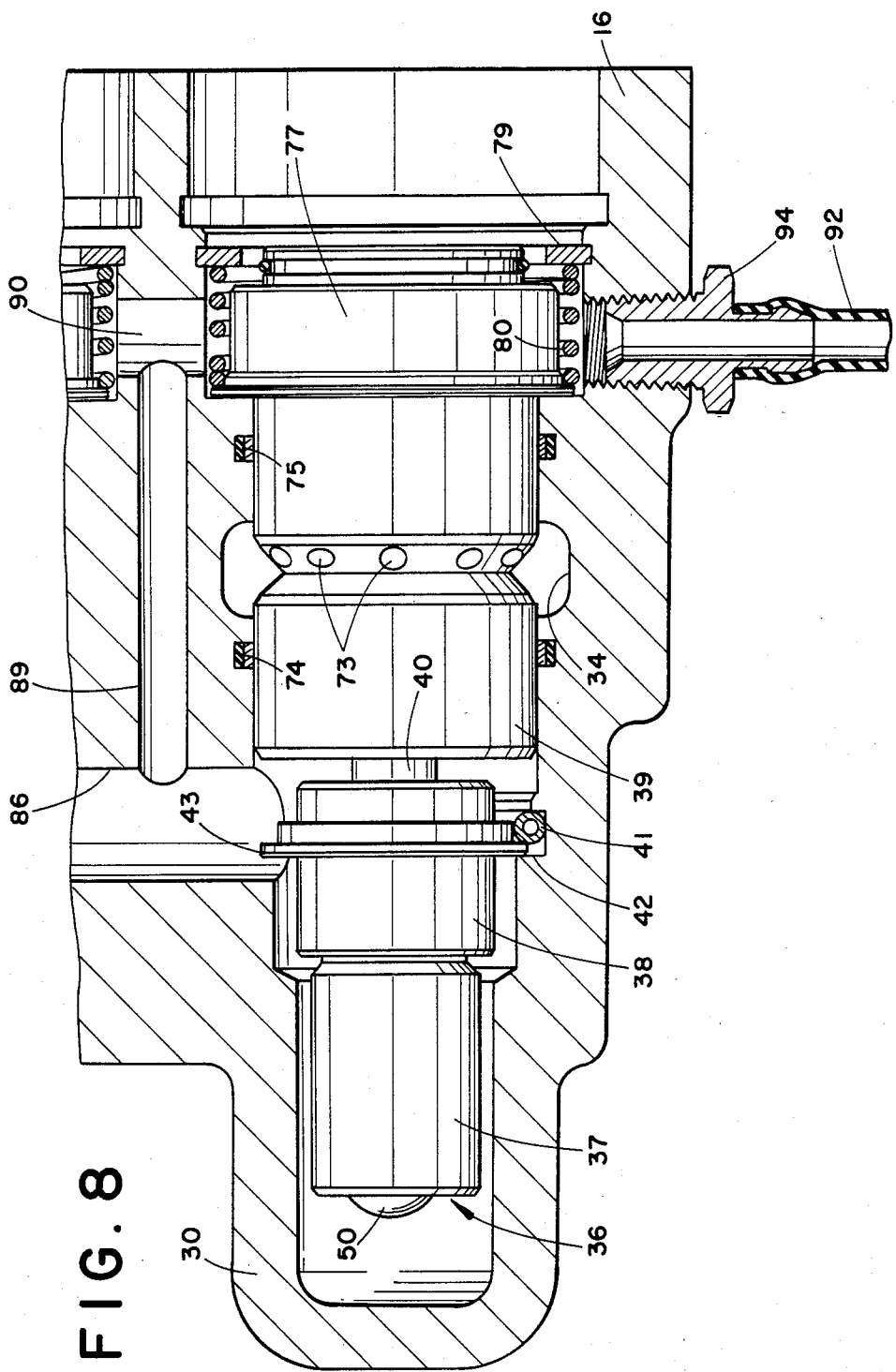
FIG. 8 is a fragmentary sectional view taken along the line 8—8 of FIG. 7.

Referring to both FIGS. 1 and 8, a cartridge assembly 36 is positioned within the bore of the female housing 30 and includes stationary tubular retainer sleeves 37 and 38, an axially slidable valve body 39, and an axially slidable spool 40. The retainer sleeves 37 and 38 are threaded together, and the sleeves are held stationary relative to the female housing 30 by a spirally wound retainer spring 41 (see also FIG. 7). The spring 41 encircles the sleeve 38 and is positioned within an annular groove 42 in the inner surface of the female housing. The spring 41 is positioned between a radially outwardly extending shoulder 43 on the sleeve 38 and the forward wall of the groove 42. The shoulder 43 is prevented from moving rearwardly by the rear wall of the groove 42.

The tubular spool 40 is slidable axially within the sleeves 37 and 38 and extends into the valve body 39. The spool 40 includes a rear portion 45 which extends into the sleeves 37 and 38 and a radially enlarged forward end portion 46 which extends into the valve body 39. The right end of the radially enlarged portion 46 engages an annular wall 47 on the valve body, and the spool is fixed relative to the valve body by an annular retainer ring 48. A passage 49 (FIG. 2) is positioned between the radially enlarged portion 46 of the spool and the valve body 39.

A screw 50 is screwed into the left end of the spool 40, and a pair of concentric coil springs 51 and 52 are positioned in the space between the screw and the sleeve 37. The right end of each spring engages a ring 53 which abuts the left end of the spool 40, and the left end of each spring engages a ring 54 which is fixed relative to the sleeve 37 by a retainer ring 55.

The spool 40 is provided with a pair of radially extending ports 56 to the right of the threaded hole for the screw 50, and in FIG. 1 the ports 56 are sealed from the cavity of the female housing by a cylindrical elastomer seal 57 (see FIG. 1). The seal 57 is retained in the annular space between the right end of the sleeve 37 and the right end of the sleeve 38, and preferably a cylindrical porous retainer 58 is positioned between the seal 57 and the outer wall of the sleeve 38. Porous retainer can be made of porous metal or other suitable material. As will be explained more fully hereinafter, the springs 51 and 52 resiliently bias the spool to the neutral or centered position illustrated in FIG. 1 in which the ports 56 are sealed from the cavity of the female housing.

A tubular piston 60 is slidably mounted within the radially enlarged forward end 46 of the spool 40 and within the valve body 39. The piston 60 includes a radially enlarged end portion 61 which in FIG. 1 abuts the wall 47 of the valve body 39 and a reduced diameter portion 62 which slides within the valve body 39. Seals 63 and 64 (FIG. 2) on the piston engage the spool 40 and the valve body 39, respectively.

A generally cylindrical valve 66 (FIG. 1) is slidable within the piston 60 and includes a closed right end 67 having a conical outer surface which is engageable with a conical seat 68 on the valve body 39. A seal 69 on the valve 66 provides a seal between the valve and the valve seat 68. A coil spring 70 engages the closed end of the valve 66 and a radially inwardly extending shoulder 71 on the spool 40 and biases the valve toward the valve seat 68. The forward end of the valve 66 is provided with a plurality of radially extending ports 72 (FIG. 1).

The valve body 39 is slidably mounted within the female housing 30, and the hydraulic fluid port 34 communicates with the interior of the tubular valve body 39 through ports 73 (FIGS. 2 and 8) which are spaced circumferentially around the valve body. Seals 74 and 75 (FIG. 1) provide a seal between the valve body 39 and the female housing 30.

The locking balls 24 in the forward end of the valve body 39 are retained by a collar 77 (FIG. 2) which surrounds the locking balls and which can slide axially between radially extending shoulder 78 on the female housing 30 and a retainer ring 79 which is positioned in an annular groove in the female housing 30. A coil spring 80 biases the collar 77 to the left in FIG. 2. A seal 81 is positioned in an annular groove on the inside of the valve body 39 and is engageable with the male housing 19 when the male coupling is inserted into the female coupling.

Operation

FIG. 1 shows the uncoupled female coupling in the normal position. The tractor hydraulic supply is connected to the port 34. Even when the control valve for the tractor fluid is off, high pressure hydraulic from a previous operation may be trapped within the port 34, the ports 73 of the valve body, and the inside of the valve 66, piston 60, and spool 40 by the seals 74 and 75 (FIG. 2), the seal 69 on the valve 66, the seals 63 and 64 (FIG. 2) on the piston 60, and the cylindrical seal 57 which is positioned outwardly of the ports 56 in the spool 40. The portion of the bore of the female housing 30 in which the retainer sleeves 37 and 38 are positioned is vented to a hydraulic reservoir or drain which is maintained at atmospheric pressure.

When the male coupling 17 is partially inserted into the female coupling the ball 21 first contacts the closed forward end of the valve 66. The forward end of the male housing 19 contacts the seal 81.

Figure 2:
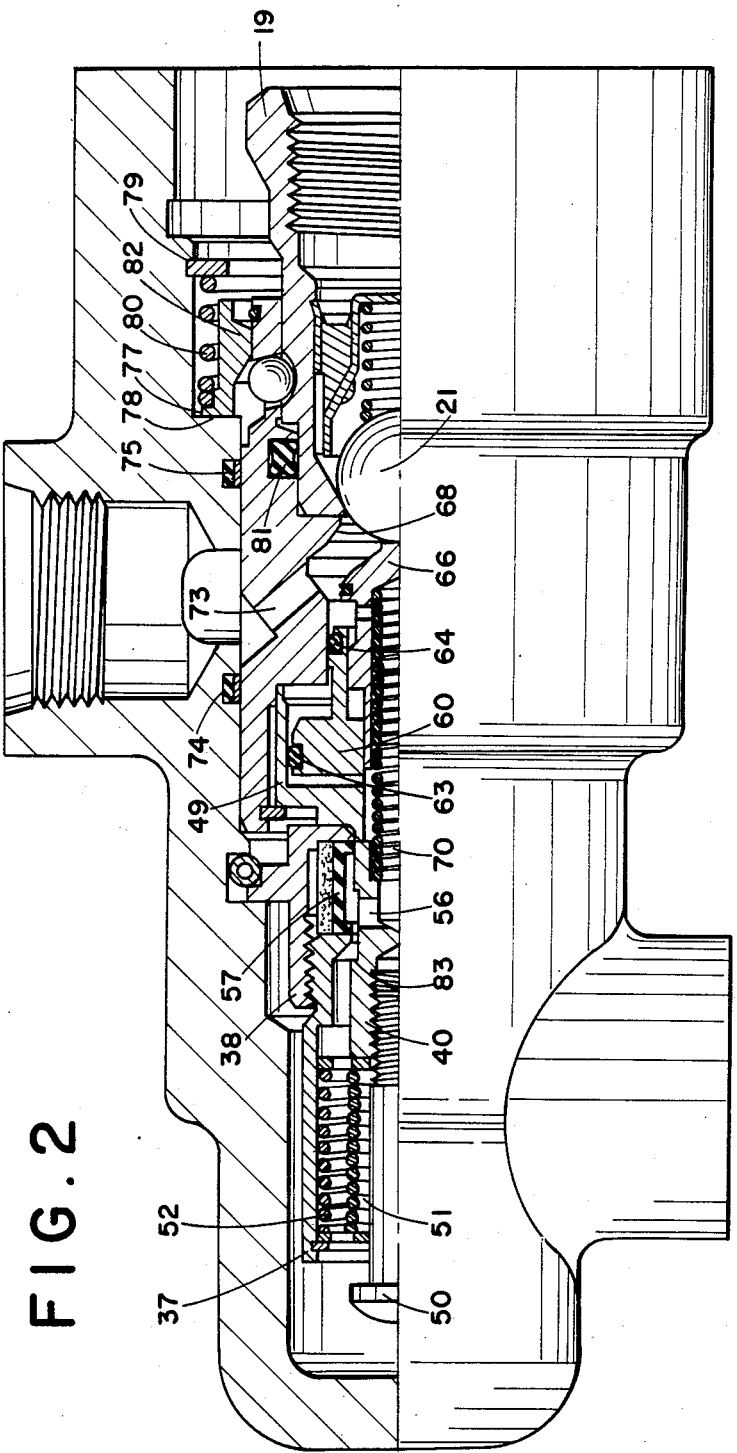
FIG. 2 is a view similar to FIG. 1 showing the male coupling fully inserted but unlatched.

FIG. 2 shows the male coupling fully inserted into the female coupling. The inside of the male coupling is pressurized by trapped high pressure hydraulic fluid, and the ball 21 forces the valve 66 to the left and also moves the spool 40 and the valve body 39 to the left against the force of springs 51 and 52 which are contained within the sleeve 37. A seat 83 on the spool is moved to the left of the seal 57, and the high pressure hydraulic fluid contained within the spool 40 and the valve 66 is dumped through the ports 56 of the spool to atmosphere. The relieving of the high pressure within the valve 66 permits the valve 66 to shift to the left against the spring 70. The ball 21 of the male coupling remains closed due to the trapped high pressure in the male coupling.

The operation illustrated by a comparison of FIGS. 1 and 3 relieves the internal hydraulic pressure in the female coupling and allows the female coupling and male coupling to come together for connection. When the insertion force on the male coupling is removed, the coil springs 51 and 52 within the sleeve 37 move the valve body 39 of the female coupling and the male coupling to the right as shown in FIG. 3. The locking balls 24 are retained in the locking groove of the male coupling by the ramp 82 of the locking collar 77, and the male coupling and female coupling are locked together.

In FIG. 3 the spool 40 has returned to its neutral, centered position, and the seal 57 closes the ports 56 in the spool from atmospheric pressure.

Figure 5:
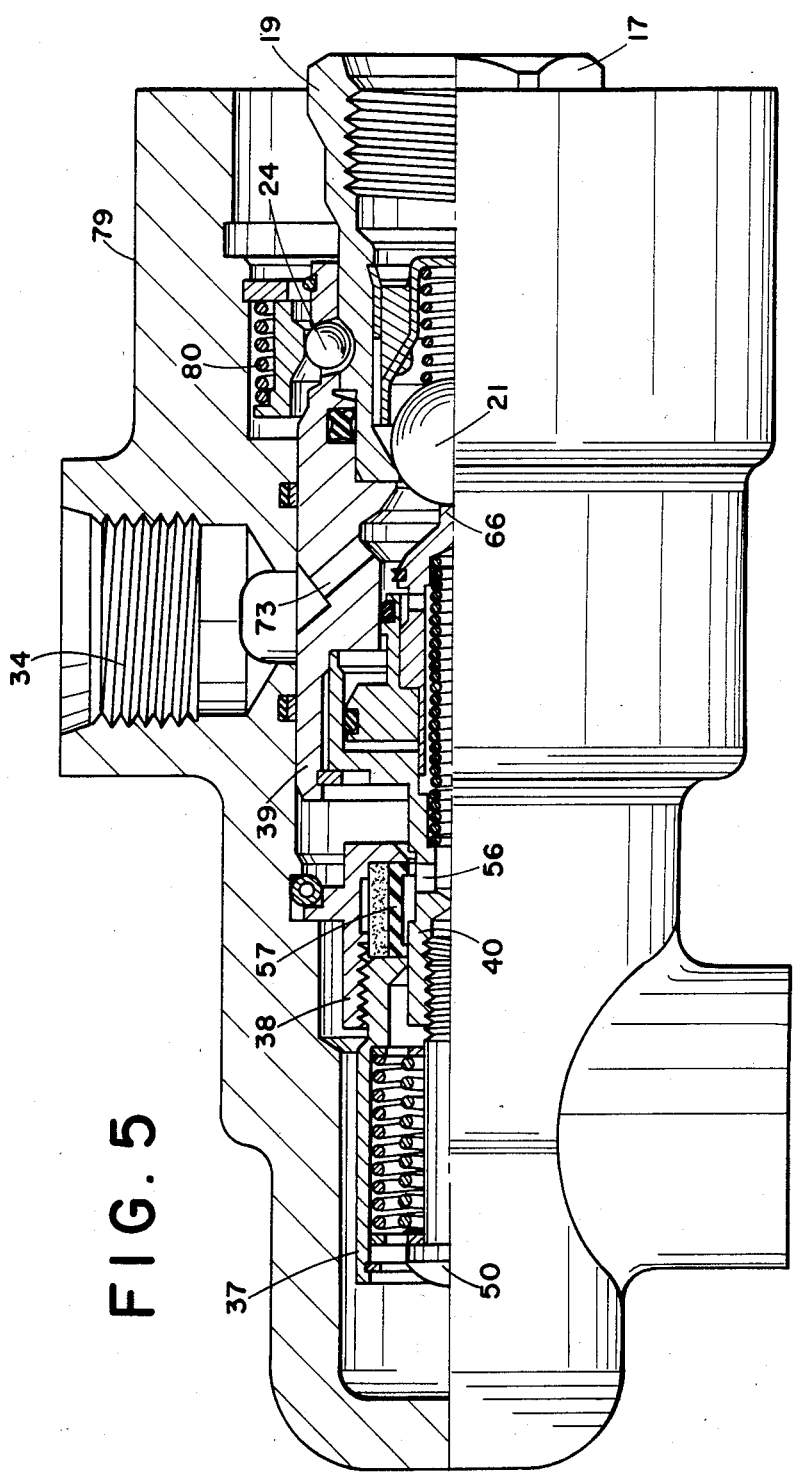
FIG. 5 shows the female coupling in the process of being disconnected.

The tractor operator then repressurizes the port 34 and the internal cavities of the valve 66 and the spool 40 by operating the control valve on the tractor. Referring to FIG. 5, the high pressure within the female coupling forces the ball 21 of the male coupling away from its seat 27 and opens the male coupling to the tractor hydraulic pressure.

If the trapped pressure in the male coupling exceeds the tractor pressure applied at port 34, the valve 66 will still force the ball 21 open. This is accomplished by the piston 60. The tractor pressure is exerted on the radially enlarged end portion 61 of the piston by virtue of the ports 72 in the valve 66. Since the diameter of the end portion 61 of the piston is greater than the diameter of the ball 21, the ball 21 can be forced open even if the pressure within the female coupling is less than the trapped pressure within the male coupling.

Figure 4:
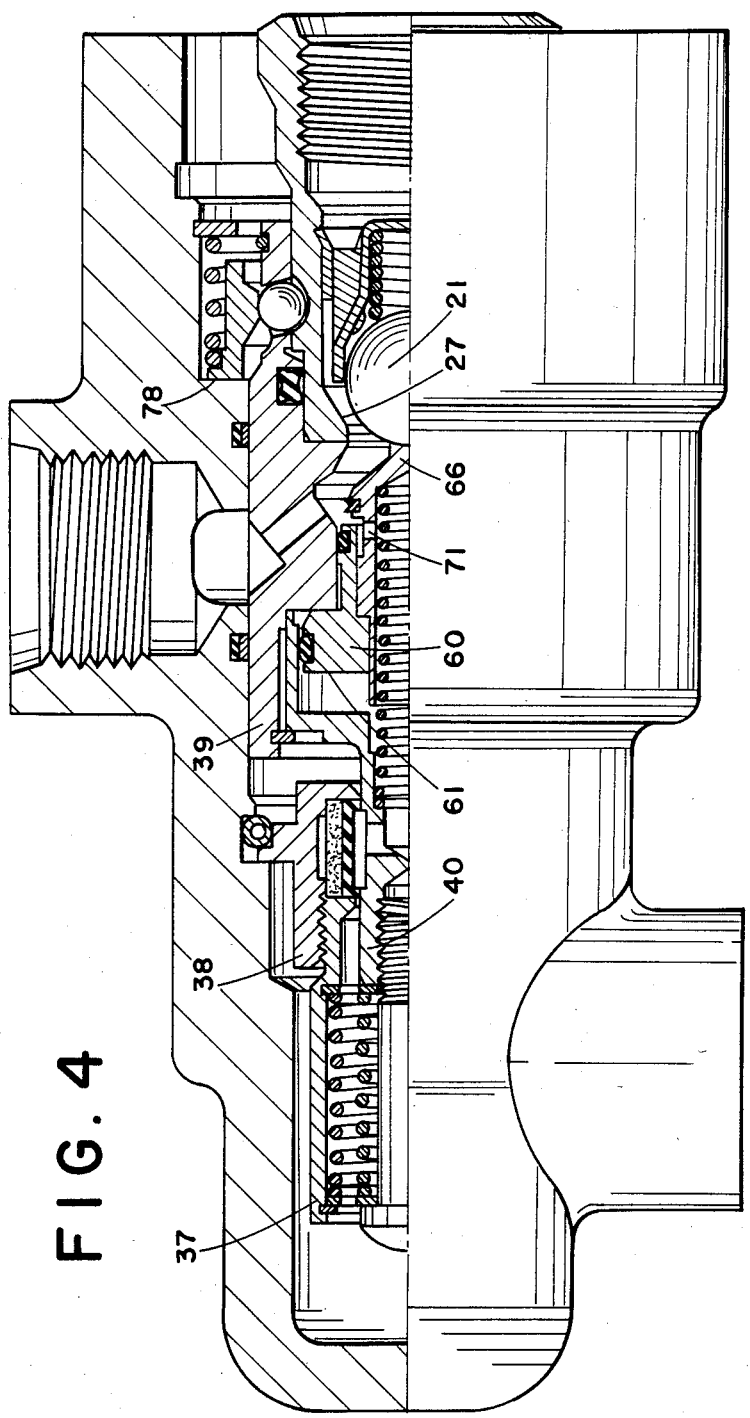
FIG. 4 is a view similar to FIG. 1 showing the female coupling pressurized and the male valve open.

When the couplings are to be disconnected, a pull force is applied to the male coupling which will shift the male coupling and the slidable internal components of the female coupling to the right from the FIG. 4 position to the FIG. 5 position. As the male coupling is pulled to the right, the locking collar 77 remains in locking engagement with the locking balls 24 because of the high friction between the collar and the balls which is caused by the high internal pressure which applies a separating force on the male coupling and female coupling. As the collar 77 moves to the right with the male coupling, the spring 80 is compressed. The movement to the right of the valve body 39 and the spool 40 is sufficient to open the seal between the spool 40 and seal 57 which extends around the ports 56 in the spool. The pressure within the spool 40 and the female valve 66 is thereby dumped to atmospheric pressure, and the ball 21 of the male coupling closes by virtue of the high trapped pressure within the male coupling.

Figure 6:
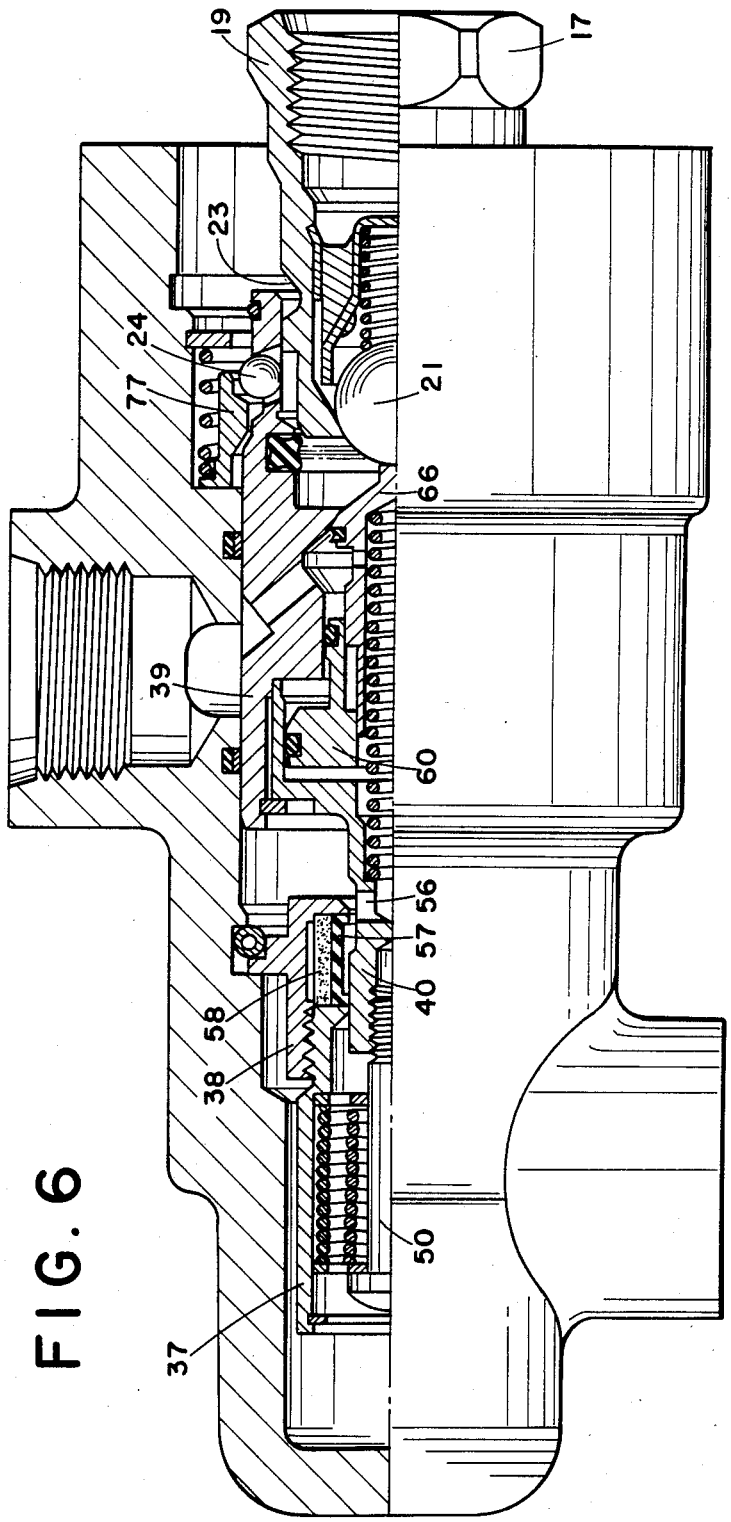
FIG. 6 shows the next step in disconnecting the male coupling.

When the internal pressure within the female coupling is dumped to atmospheric pressure, the friction forces between the locking balls 24 and the locking collar 77 reduce to normal operation force levels. The internal parts of the female coupling continue to move to the right as shown in FIG. 6. The coil spring 80 around the locking collar returns the locking collar to its normal position, and the locking balls 24 are released from their locking position under the ramp 82, allowing the male coupling to be removed from the female coupling. At the time of disconnection both the ball 21 of the male coupling and the valve 66 of the female coupling are closed. The internal cavities of the female coupling are at atmospheric pressure, and there is therefore no release of pressurized oil during disconnection.

The cylindrical seal 57 which surrounds the ports 56 of the spool 40 is made from an elastomer material and is retained within a cylindrical porous metal retainer 58 (see also FIG. 7). The spool 40 shifts to the left and right during connecting and disconnection, thereby permitting dumping of high pressure from within the spool to the cavity surrounding the spool which is at atmospheric pressure. This opening and closing of a high pressure cavity normally tends to pull an elastomer seal out of its retaining groove toward the low pressure cavity. However, with the porous metal retainer 58, the high pressure within the spool forces the seal 57 into the retaining groove provided by the sleeves 37 and 38, and the seal is maintained in position during operation of the coupling. After the female coupling and the male coupling have been disconnected, the coil springs 51 and 52 return the slidable parts within the female housing to the neutral centered position which is shown in FIG. 1.

Referring to FIG. 7, a pair of female couplings 16 are employed and connected by a bridging portion 85 which is formed integrally with each of the female housings 30. It is understood that one or more than two couplings could equally well be used in a housing.

The internal cavity of each of the female housings 30 communicates with a bore 86 in the bridging portion 85, and the port 86 is connected to a hydraulic fluid reservoir which is maintained at atmospheric pressure by a port 87 and a hose 88.

A second method of venting the internal cavity of the female coupling to atmospheric pressure is illustrated in FIG. 8. Port 86 is connected through passage 89 to cavity 90. A port 91 and a hose 92 are connected to the cavity 90 and can drain pressure relief fluid along with normal disconnect spillage to a remote location.

Comparing FIGS. 1, 7, and 8, the internal cartridge 36 of the female coupling is retained within the female housing 30 by the spirally wound spring 41. The spring 41 engages the forward wall of the annular groove 42 in the female housing and retains the shoulder 43 of the sleeve 38 against the rear wall of the annular groove. The spring 41 is inserted into each of the female housings through the ports 87 and 86 (FIG. 7) and is fed into the annular groove 42 of each female housing. The cartridge 36 can be removed from the female housing by removing the spring 41 and the retainer ring 79 for the spring 80 and the locking collar 77. The cartridge can then be withdrawn through the forward end of the female housing and replaced with a new cartridge. Assembly and field repair of the female coupling is therefore facilitated.

Summarizing, the female coupling dumps the trapped internal pressure of the female coupling to atmospheric pressure (reservoir, ground, etc.) during connecting of the male coupling, thereby reducing the force required for connection. After connection, the large area of the piston 60 permits a low pressure within the female coupling to overcome a higher pressure within the male coupling in order to open a male valve. During disconnection, the locking collar 77, the locking balls 24, and the valve body 39 shift together to the right and the spool 40 dumps the internal pressure in the female housing. After the internal pressure in the female housing is dumped, the friction between the locking collar and the locking balls returns to normal, and the female coupling moves to the second stage of disconnection. The female coupling thereby enables easy disconnection at high internal pressures whereas previous designs require unreasonably high forces for disconnection.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A female quick connect and disconnect coupling comprising:

an outer tubular housing having an internal bore and an open forward end adapted to receive a male coupling, a first port adapted to supply pressurized hydraulic fluid to the bore of the housing, and a second port adapted to relieve hydraulic fluid pressure in the bore of the housing;

a seal mounted within the bore of the housing;

a tubular valve body slidably mounted in the bore of the housing and having a port communicating with said first port in the outer housing;

a tubular spool attached to the valve body and having a port therein, the spool being slidable relative to the seal to open and close the port in the spool whereby hydraulic fluid pressure in the valve body and the spool can be relieved when the spool is moved to open the port therein.

2. The coupling of claim 1 in which the seal is cylindrical and the spool is slidable axially within the seal.

3. The coupling of claim 2 in which the spool is movable between a neutral position in which the port therein is closed by the seal, a first open position rearward of the neutral position is which the port therein is open, and a second open position forward of the neutral position in which the port therein is also open.

4. The coupling of claim 3 including springs engaging the spool for resiliently urging the spool to the neutral position.

5. The coupling of claim 1 including a porous seal retainer positioned radially outwardly of the seal for maintaining said seal in proper position.

6. The coupling of claim 5 including a retainer sleeve having a radially outwardly extending shoulder which engages an annular groove in the outer housing to prevent the seal retainer from moving rearwardly, and retainer means removably positioned in said groove and engaging the shoulder of the seal retainer for preventing the seal retainer from moving forwardly.

7. The coupling of claim 1 including a valve member in said female coupling slidably mounted within the valve body and movable between a closed position in which said first port in the outer housing is sealed from the open end of the housing and an open position in which said first port of the outer housing communicates with the open end of the housing, and a piston slidably mounted within the housing and slidably engageable with the valve member to move the valve member toward the closed position, the piston having a larger diameter than the diameter of a valve member in the associated male coupling.

8. The coupling of claim 7 in which the valve member in said female coupling is tubular and is provided with a port which communicates said first port in the outer housing with the interior of the valve member and the spool.

9. The coupling of claim 8 including a spring within the valve member engaging the spool and the valve member of resiliently biasing the valve member to its closed position.

10. The coupling of claim 1 including a passage means for connecting said second port with said open forward end of the internal bore.

11. A female quick connect and disconnect coupling comprising:

an outer tubular housing having an internal bore and an open forward end adapted to receive a male coupling, a first port adapted to supply pressurized hydraulic fluid to the bore of the housing, and a second port and spool therein adapted to relieve hydraulic fluid pressure in the bore of the housing;

locking means; and a locking collar being biased to a completely coupling connected first position by spring means in direct engagement with said locking means and remaining in function engagement with said locking means until reaching a second position, said second position being prior to uncoupled position thereby providing sufficient spool travel to relieve hydraulic fluid pressure in the bore of the housing.

* * * * *